(12) United States Patent
Lee et al.

(10) Patent No.: US 8,934,912 B2
(45) Date of Patent: Jan. 13, 2015

(54) METHOD FOR DECIDING UNREGISTERED MACROCELL USER EQUIPMENT ADJACENT TO FEMTOCELL BASE STATION

(75) Inventors: Mi Young Lee, Daejeon (KR); Bon Tae Koo, Daejeon (KR); Young Min Kwon, Seongnam (KR); Sueng Jae Bae, Suwon (KR); Min Young Chung, Seoul (KR)

(73) Assignees: Electronics and Telecommunications Research Institute, Daejeon (KR); Sungkyunkwan University, Gyeonggi (KR)

( * ) Notice: Subject to any disclaimer, the term of this patent is extended or adjusted under 35 U.S.C. 154(b) by 539 days.

(21) Appl. No.: 13/290,808

(22) Filed: Nov. 7, 2011

(65) Prior Publication Data

US 2012/0115474 A1 May 10, 2012

(30) Foreign Application Priority Data

Nov. 8, 2010 (KR) .................. 10-2010-0110660
Nov. 2, 2011 (KR) .................. 10-2011-0113076

(51) Int. Cl.
| | | |
|---|---|---|
| *H04W 36/00* | (2009.01) | |
| *H04W 4/00* | (2009.01) | |
| *H04B 15/00* | (2006.01) | |
| *H04W 72/08* | (2009.01) | |
| *H04W 8/18* | (2009.01) | |
| *H04W 36/20* | (2009.01) | |
| *H04W 48/14* | (2009.01) | |
| *H04W 84/04* | (2009.01) | |

(52) U.S. Cl.
CPC ............ *H04W 72/082* (2013.01); *H04W 8/186* (2013.01); *H04W 36/20* (2013.01); *H04W 48/14* (2013.01); *H04W 84/045* (2013.01)
USPC ........ 455/444; 455/435.1; 455/437; 455/438; 455/443; 455/501; 370/338; 370/331; 370/332

(58) Field of Classification Search
CPC ......................... H04W 84/045; H04W 52/244
USPC .............. 455/435.1, 437–438, 443–444, 501; 370/338, 331–332
See application file for complete search history.

(56) References Cited

U.S. PATENT DOCUMENTS

2010/0330994 A1* 12/2010 Matsuo et al. ................ 455/436
2011/0051684 A1* 3/2011 Li et al. ......................... 370/331
(Continued)

FOREIGN PATENT DOCUMENTS

| KR | 1020100061334 A | 6/2010 |
|---|---|---|
| WO | WO 2009095970 A1 * | 8/2009 |

*Primary Examiner* — Jinsong Hu
*Assistant Examiner* — Dung Hong

(57) ABSTRACT

In a method for deciding an unregistered macrocell user equipment (MUE) adjacent to a femtocell base station (home evolved node B; HeNB), a macrocell base station (macro evolved node B; MeNB) decides occurrence of an unregistered MUE influenced by interference from a HeNB among MUEs. The MeNB requests an adjacent HeNB to transmit system information (SI) of the adjacent HeNB of which interference has influence on the unregistered MUE, and the unregistered MUE searches for the SI of the adjacent HeNB and transmits the searched SI to the MeNB, when it is decided that the unregistered MUE has occurred. The MeNB informs the adjacent HeNB of existence of the unregistered MUE using a closed subscriber group identifier (CSG ID) of the SI of the adjacent HeNB, transmitted from the unregistered MUE.

12 Claims, 3 Drawing Sheets

(56) References Cited

U.S. PATENT DOCUMENTS

2012/0083280 A1* 4/2012 Liu et al. .................. 455/446
2012/0244903 A1* 9/2012 Fong et al. ................ 455/517
2013/0109395 A1* 5/2013 Szufarska et al. .......... 455/437

* cited by examiner

METHOD FOR DECIDING UNREGISTERED MACROCELL USER EQUIPMENT ADJACENT TO FEMTOCELL BASE STATION

CROSS-REFERENCES TO RELATED APPLICATIONS

The present application claims priority under 35 U.S.C 119(a) to Korean Application No. 10-2010-0110660, filed on Nov. 8, 2010, and Korean Application No. 10-2011-0113076, filed on Nov. 2, 2011 in the Korean Intellectual Property Office, which is incorporated herein by reference in its entirety set forth in full.

BACKGROUND

Exemplary embodiments of the present invention relate to a 3rd generation partnership project (3GPP) long term evolution (LTE) system, and more particularly, to a method for deciding an unregistered macrocell user equipment (MUE) adjacent to a femtocell base station, which decides an MUE influenced by interference around a femtocell base station using a handover defined in the 3GPP LTE standard.

In the 3GPP LTE, the standardization on a femtocell base station is conducted to remove a shadow area of a user equipment indoors and secure a high-speed data transmission rate.

The femtocell base station (home evolved node B; HeNB) is a femto-sized base station using low power, and provides a radio access service coverage narrower than a macrocell base station. Since the HeNB uses the same radio interface as the macrocell base station, the HeNB can provide a service without adding a separate interface to a radio user equipment. Further, since the HeNB is connected to a core network by accessing a public network through Ethernet and a cable modem, the HeNB has low installation and management cost as compared with the macrocell base station using a provider private network.

The macrocell base station (macro evolved node B; MeNB) uses an open access for providing a downlink radio access service to all user equipments (UEs) existing in its own service coverage.

On the other hand, the MeNB basically uses a closed subscriber group (CSG) for providing a radio access service to only a previously registered UE. In order to support the CSG, each HeNB receives a unique CSG identity (CSG ID) provided in the same public land mobile network (PLMN), and each UE has a CSG list (CSG whitelist) in which the unique CSG ID of a HeNB having a service coverage is stored.

In order for a macrocell UE (MUE) to receive the downlink radio access service from a HeNB, an identification number of the corresponding HeNB is necessarily included in an identification number list of the MUE.

If the MUE approaches a HeNB of which identification number is not registered in its identification number list, the MUE cannot receive a radio access service in the corresponding HeNB.

Therefore, if the corresponding HeNB is in course of providing a radio access service to a femtocell UE (home UE: HUE) through the same channel in terms of the downlink, the signal-to-interference noise ratio (SINR) performance of the MUE is considerably lowered due to an interference caused by a leakage signal of the HeNB, and therefore, deterioration of call quality or call-drop may occur.

Accordingly, when an MUE is influenced by interference of a HeNB while remaining in an existing cell due to an access limitation to the HeNB in which the MUE is not registered, there is provided a method for reducing the interference.

The background art of the present invention has been disclosed in Korean Patent Laid-Open Publication No. 10-2011-0067604, filed on Jun. 22, 2011.

SUMMARY

An embodiment of the present invention relates to a method for deciding an unregistered MUE adjacent to a femtocell, in which the unregistered MUE influenced by interfere from an adjacent femtocell base station informs the corresponding femtocell base station of its existence using a handover defined in the 3GPP LTE standard, so that it is possible to facilitate the same channel interference coordination between macrocell and femtocell base stations.

In one embodiment, a method for deciding an unregistered macrocell user equipment (MUE) adjacent to a femtocell base station (home evolved node B; HeNB) includes deciding, by a macrocell base station (macro evolved node B; MeNB), occurrence of an unregistered MUE influenced by interference from a HeNB among MUEs; requesting, by the MeNB, an adjacent HeNB to transmit system information (SI) of the adjacent HeNB of which interference has influence on the unregistered MUE, searching for, by the unregistered MUE, the SI of the adjacent HeNB and transmitting the searched SI to the MeNB, when it is decided that the unregistered MUE has occurred; and informing, by the MeNB, the adjacent HeNB of existence of the unregistered MUE using a closed subscriber group identifier (CSG ID) of the SI of the adjacent HeNB, transmitted from the unregistered MUE.

The deciding of the occurrence of the unregistered MUE may include identifying, by the unregistered MUE, the adjacent HeNB; and comparing, by the unregistered MUE, the CSG ID and dedicated CSG ID of the adjacent HeNB with its own whitelist and transmitting a proximity indication message to the MeNB using a handover (HO).

The unregistered MUE identifying the adjacent HeNB may include transmitting, by the MeNB, a ReportProximityConfig message to the unregistered MUE; performing, by the unregistered MUE, an autonomous search and receiving a SystemInformationBlock (SIB) Type1 message from the adjacent HeNB, when identifying the ReportProximityConfig message; and decoding, by the unregistered MUE, the CSG ID of the adjacent HeNB in the SIB Type1 message and identifying the adjacent HeNB.

The ReportProximityConfig message may be transmitted by being contained in an RRCConnectionReconfiguration message.

The unregistered MUE searching for the SI of the adjacent HeNB and transmitting the searched SI to the MeNB may include transmitting, by the MeNB, an RRCConnectionReconfiguration message containing a Measurement Configuration (MeasConfig) message to the unregistered MUE; transmitting, by the unregistered MUE, a measurement report message containing physical cell identifier (PCI) of the adjacent HeNB to the MeNB; commanding, by the MeNB, the unregistered MUE to collect the SI of the adjacent HeNB; transmitting, by the unregistered MUE, the SI to the MeNB; and comparing, by the unregistered MUE, the CSG ID and dedicated CSG ID of the adjacent HeNB with its own whitelist, and requesting the MeNB of a HO or transmitting interference coordination (IC) indication to the MeNB depending on the presence of correspondence.

The SI may be transmitted by being contained in the measurement report message.

The IC indication may be transmitted by being contained in the measurement report message.

The transmitting of the IC indication to the MeNB may further include performing a HO to the MeNB, when the CSG ID and dedicated CSG ID of the adjacent HeNB correspond to those in the CSG whitelist of the unregistered MUE.

When the CSG ID and dedicated CSG ID of the adjacent HeNB correspond to those in the CSG whitelist of the unregistered MUE, member indication may be set as 'member'.

In the informing of the adjacent HeNB of the existence of the unregistered MUE, the unregistered MUE may transmit the IC indication to the MeNB when only the dedicated CSG ID of the adjacent HeNB correspond to that in the CSG whitelist of the unregistered MUE.

In the informing of the adjacent HeNB of the existence of the unregistered MUE, the unregistered MUE may set the member indication as 'non-member' when only the dedicated CSG ID of the adjacent HeNB correspond to that in the CSG whitelist of the unregistered MUE.

The informing of the adjacent HeNB of the existence of the unregistered MUE may include transmitting, to a mobility management entity (MME), a HO request message containing cell global identity (CGI), CSG ID, IC indication and csg_MemberStatus; identifying, by the MME, whether or not the IC indication is contained in the HO request message, and transmitting an IC request message containing the IC indication to the adjacent HeNB, when it is identified that the IC indication is contained in the HO request message; and comparing, by the adjacent HeNB, the CSG ID in the IC request message with its own CSG ID, and deciding that the unregistered MUE exists, when the CSG ID in the IC request message corresponds to its own CSG ID.

In the transmitting of the IC request message containing the IC indication to the adjacent HeNB, the MME may transmit a HO preparation failure message to the MeNB, when the IC indication is contained in the IC request message.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Hereinafter, embodiments of the present invention will be described with reference to accompanying drawings. However, the embodiments are for illustrative purposes only and are not intended to limit the scope of the invention.

Figure 1:
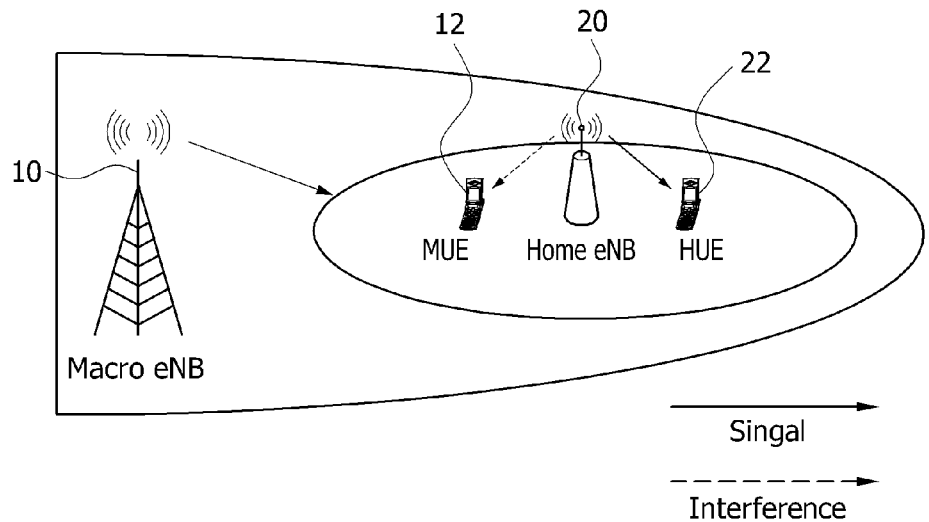
FIG. 1 illustrates an interference scenario between a femtocell base station and an unregistered macrocell user equipment in a downlink according to an embodiment of the present invention.
Figure 2:
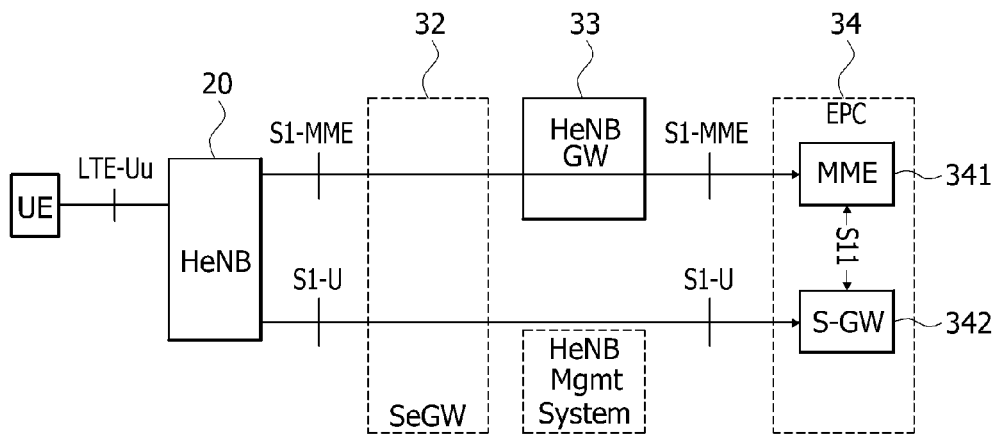
FIG. 2 illustrates a schematic structure of a femtocell network in a 3rd generation partnership projection (3GPP) long term evolution (LTE) system according to the embodiment of the present invention.
Figure 3:
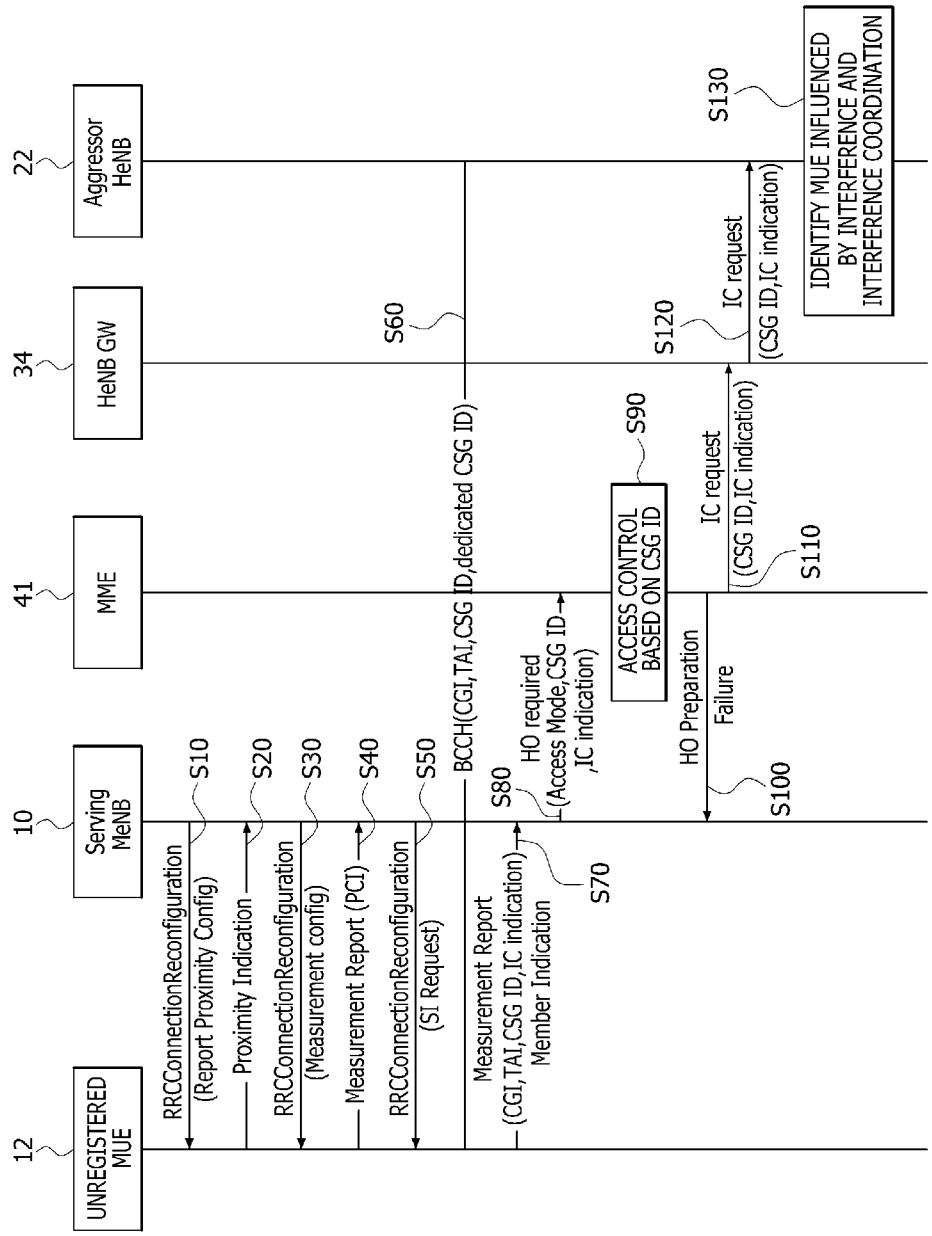
FIG. 3 illustrates a method for deciding an unregistered macrocell user equipment adjacent to a femtocell base station according to the embodiment of the present invention.
Figure 4:
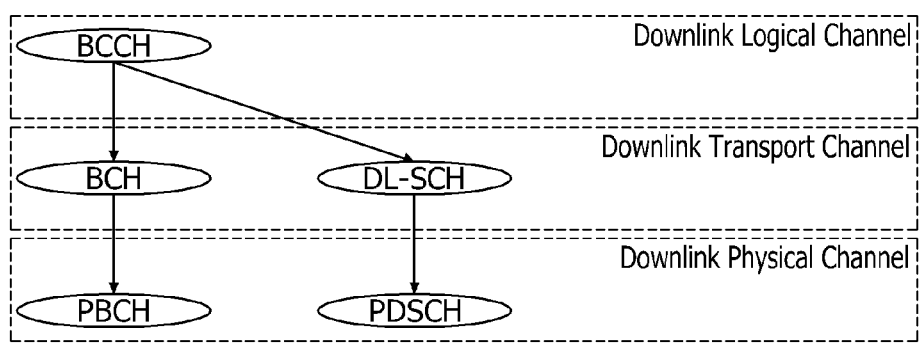
FIG. 4 illustrates a mapping procedure of a channel between layers used when system information is transmitted in the 3GPP LTE system according to the embodiment of the present invention.

FIG. 1 illustrates an interference scenario between a femtocell base station and an unregistered macrocell user equipment in a downlink according to an embodiment of the present invention. FIG. 2 illustrates a schematic structure of a femtocell network in a 3rd generation partnership projection (3GPP) long term evolution (LTE) system according to the embodiment of the present invention. FIG. 3 illustrates a method for deciding an unregistered macrocell user equipment adjacent to a femtocell base station according to the embodiment of the present invention. FIG. 4 illustrates a mapping procedure of a channel between layers used when system information is transmitted in the 3GPP LTE system according to the embodiment of the present invention.

Referring to FIG. 1, a macrocell base station (macro evolved node B; MeNB) 10 is a base station that provides a service to a macrocell user. A macrocell refers to an area in which the MeNB 10 can provide a service. A macrocell user equipment (MUE) 12 refers to a user equipment that has received a service from a corresponding MeNB 10 in the macrocell.

A femtocell base station (home evolved node B; HeNB) 20 is a base station that provides a service to a femtocell user. A femtocell user equipment (home user equipment; HUE) 22 refers to a user equipment that has received a service from a corresponding HeNB 20 in a femtocell.

A plurality of femtocells may be included in the macrocell. However, it is illustrated in this embodiment that one femtocell is included in one macrocell.

The femtocell network based on the 3GPP LTE based femtocell network applied to the present invention includes, as illustrated in FIG. 2, the HeNB 20, a femtocell network gateway (HeNB gateway; hereinafter, referred to as a 'HeNB GW') 33 and an EPC 34.

The HeNB 20 provides a radio access service to a user equipment (UE) through a radio interface (LTE-Uu) with the UE.

The HeNB GW 33 is a network element for supporting a plurality of HeNBs 20, and performs a control plane function such as management of user's mobility.

The EPC 34 includes a mobility management entity (hereinafter, referred to as an 'MME') 341 and a serving gateway (hereinafter, referred to as an 'S-GW') 342.

The MME 341 manages the HeNB 20 and has access information of a UE or information on ability of the UE. The connection information of the UE or the information on the ability of the UE is used to manage mobility of the UE. The MME 341 performs a signal control between the HeNB 20 and the S-GW 342 and performs routing of data traffic of the UE.

The S-GW 342 performs an anchoring function when the UE moves between the MeNB 10 and the HeNB 20.

An SI interface connects the HeNB 20 and the EPC 34 to each other, and allows control signal traffic and use data to be communicated between the HeNB 20 and the EPC 34 therethrough.

In a case where an unregistered MUE 12 not registered in a HeNB 20 approaches the HeNB 20 using a handover (HO) from the MeNB 10 to HeNB 20, defined in the 3GPP LTE standard, the unregistered MUE 12 informs the corresponding HeNB 20 of its existence.

In order to inform the HeNB 20 of the existence of the unregistered MUE 12 as described above, the use of a dedicated CSG ID is extended, and interference coordination (IC) indication information and an IC request message are defined as follows.

According to the 3GPP LTE standard, the dedicated CSG ID is stored in a provider's CSG list to which the MUE 12 belongs. The dedicated CSG ID is used to allow accesses of MUEs 12 to the HeNB 20 registered by the corresponding provider.

In this embodiment, in order for the MUE 12 to collect information on an unregistered HeNB 20, the use of the dedicated CSG ID is defined as follows.

First, each of all the MUEs 12 stores a dedicated CSG ID in its own CSG ID whitelist. Here, the whitelist is a list of a CSG in which a UE itself is registered as a member, and the UE can access the HeNB 20 through the whitelist.

Second, the HeNB 20 periodically broadcasts, to all the MUEs 12, its own unique CSG ID and the same dedicated CSG ID as stored in all the MUEs 12 at the same time.

In this embodiment, it is defined that the IC indication information and the IC request message have the following functions so that the unregistered MUE 12 can inform the HeNB 20 of its existence using the SI interface defined in the 3GPP LTE standard.

The IC indication information is information for informing the HeNB 20 of the existence of the unregistered MUE 12.

The IC request message is a message defined to precisely transmit a message from the MUE 12 to a corresponding HeNB 20. The IC request message contains the CSG ID and IC indication information received by the unregistered MUE 12.

In the method according to this embodiment, an unregistered MUE 12 transmits a message for informing an adjacent HeNB 20 of its existence.

First, a MeNB 10 decides whether or not an unregistered MUE 12 influenced by interference of an adjacent HeNB 20 occurs.

That is, the MUE 12 periodically reports its own channel status to the MeNB 10. If the channel status of the MUE 12 is deteriorated, i.e., if interference occurs, the MeNB 10 requests the MUE 12 to perform a proximity search. If it is decided that the MUE 12 has been influenced by interference of the adjacent HeNB 20, the MUE 12 transmits a proximity indication message to the MeNB 10.

As the decided result, the unregistered MUE 12 influenced by the interference searches for system information (SI) on the adjacent HeNB 20 that becomes a cause of the interference, and transmits the searched SI to the MeNB 10.

That is, the MeNB 10 requests the MUE 12 to collect the SI on the corresponding HeNB 20. The MUE 12 decides whether the access of the MUE 12 to the HeNB of which interference has influence on the MUE 12 is possible or impossible based on the CSG ID information of the HeNB 20. If it is decided that the access is impossible, the MUE 12 decides the corresponding HeNB 20 as an aggressor HeNB, and informs the MeNB 10 of the impossibility of the access together with the SI of the HeNB 20.

If the MeNB 10 receives SI from the MUE 12 influenced by the interference, the MeNB 10 informs the adjacent HeNB 20 that the MUE 12 influenced by the interference has occurred through a network using the CSG ID of the HeNB 20.

Hereinafter, the method according to this embodiment will be described with reference to FIG. 3.

First, if an unregistered MUE approaches a service coverage of a HeNB 20, a MeNB (source MeNB; S-MeNB) 10 providing a radio access service to an MUE 12 transmits an RRC Connection Reconfiguration (RRCConnectionReconfiguration) message containing ReportProximityConfig to the MUE 12 (S10).

The S-MeNB 10 sets radio resource control (RRC) connection information for the purpose of control of the MUE.

Here, the RRCConnectionReconfiguration message is used to change the previously set RRC connection information when the S-MeNB 10 performs a handover of the MUE 12 or requests the MUE 12 to measure specific information.

The ReportProximityConfig is contained in the RRCConnectionReconfiguration message. The ReportProximityConfig is an option that allows the MUE 12 to perform a proximity search operation using an autonomous search function.

If the MUE 12 identifies the ReportproximityConfig in the RRCConnectionReconfiguration message.

The MUE 12 receives a SystemInformationBlock (SIB) Type1 message periodically broadcasted from each HeNB 20 using the autonomous search function.

The MUE 12 can identify that the HeNB 20 is adjacent thereto by decoding a CSG ID in the SIB Type1 message transmitted from the corresponding HeNB 20.

That is, as illustrated in FIG. 4, the SIB Type1 message is transmitted through a physical downlink shared channel (PDSCH) in a physical layer.

The downlink reference signal received level (RSRP) of a reference signal for decoding information in the PDSCH is −97 dBm/15 kHz or more. The signal-to-interference noise ratio (SINR) of the reference signal is defined as −1.0 dB.

Subsequently, the MUE 12 identifies a CSG ID broadcasted from the HeNB 20 and a dedicated CSG ID of the HeNB 20 using the autonomous search function and then compares the CSG ID and dedicated CSG ID with a CSG whitelist possessed by the MUE 12.

Since each of all the MUEs 12 has a dedicated CSG ID contained in the CSG whitelist, the MUE 12 transmits a proximity indication message to the S-MeNB 10 using the HO (S20).

If the S-MeNB 10 receives the proximity indication message transmitted from the MUE 12, the S-MeNB 10 transmits an RRCConnectionReconfiguration message containing Measurement Configuration (MeasConfig) message so as to command the MUE 12 to perform channel measurement (S30).

The MUE 12 receiving the RRCConnectionReconfiguration message transmits a measurementReport message containing a physical cell identifier (PCI) of the HeNB 20 to the S-MeNB 10 (S40).

The S-MeNB 10 commands the MUE 12 to collect SI on the HeNB 20 having the specific PCI transmitted from the MUE 12 (S50).

If the MUE 12 receives the command on the SI collection, the MUE 12 uses an autonomous gap function of restrictively stopping communication with the S-MeNB 10 so as to collect SI such as cell global identity (CGI), tracking area identity (TAI) or CSG ID (S60).

If the MUE 12 collects the SI such as CGI, TAI or CSG ID using the autonomous gap function, the MUE 12 transmits a MeasurementReport message containing the SI such as CGI, TAI or CSG ID to the MUE 12 (S70).

The MUE 12 identifies the received CSG ID and dedicated CSG ID of the adjacent HeNB 20 and then compares the identified CSG ID and dedicated CSG ID with its CSG whitelist.

If it is compared that a CSG ID corresponding to the CSG ID of the adjacent HeNB 20 except the dedicated CSG ID exists in the CSG whitelist, the MUE 12 sets member indication as 'member' and performs a handover to the HeNB 20.

However, if only the dedicated CSG ID in the CSG whitelist corresponds to the dedicated CSG ID of the adjacent HeNB 20, the MUE 12 sets the member indication as 'non-member.'

The MUE 12 transmits, to the S-MeNB 10, a MeasurementReport message containing interference coordination indication for informing the adjacent HeNB 20 of which interference has influence on the MUE 12.

The S-MeNB 10 transmits a HandOver required message to an MME 341 through an SI interface (S80). Here, the HandOver required message contains CGI, CSG ID, IC indication and csg_MemberStatus of the HeNB 20.

Subsequently, the MME 341 decides whether or not the IC indication is contained in the transmitted HandOver required message.

If it is decided that the IC indication is not contained in the transmitted HandOver required message, the MME 341 transmits a HandOver required message containing CSG ID and csg_MemberStatus of the HeNB 20 to a HeNB GW 33 so as to request the HeNB 20 having the corresponding CSG ID to prepare a handover of the MUE 12.

In a case where the IC indication is contained in the transmitted HandOver required message, the MME 341 prepares to transmit an IC request message containing the CSG ID and IC indication of the corresponding HeNB 20 to the HeNB GW 33 (S90).

The MME 341 transmits a HO preparation failure message to the S-MeNB 10 and informs the S-MeNB 10 that the handover has been denied because the corresponding MUE 12 is a user not registered in the HeNB 20 (S100).

The MME 341 transmits the IC request message containing the IC indication to the HeNB 20 via the HeNB-GW 33 (S110 and S120).

The HeNB 20 identifies CSG ID and IC indication in the received IC request message and then compares the identified CSG ID with its own unique CSG ID periodically broadcasted by the HeNB 20.

If it is compared that the CSG ID in the IC request message corresponds to its own unique CSG ID, the HeNB 20 decides that an unregistered MUE 12 exists at a position adjacent to the HeNB 20, and performs an operation for reducing interference having influence on the corresponding MUE 12.

As described above, according to the present invention, an MUE influenced by interference directly informs a HeNB of its own existence, so that it is possible to perform more precise and efficient interference coordination between the HeNB and the MUE.

Further, the method according the present invention is applicable without a large change in the existing 3GPP LTE standard. The method according to the present invention can be implemented by adding IC indication and IC request in a handover between the MUE and HeNB used in the existing 3GPP LTE standard.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A method for deciding an unregistered macrocell user equipment (MUE) adjacent to a femtocell base station (home evolved node B; HeNB), the method comprising:
deciding, by a macrocell base station (macro evolved node B; MeNB), that an unregistered MUE is influenced by interference from an adjacent HeNB based on a channel status of the unregistered MUE;
requesting, by the MeNB, the unregistered MUE to perform a proximity search to collect system information (SI) of the adjacent HeNB of which interference has influence on the unregistered MUE, searching for, by the unregistered MUE, the SI of the adjacent HeNB, and transmitting the searched SI to the MeNB, when it is decided that the unregistered MUE is influenced by interference from the adjacent HeNB; and
informing, by the MeNB, the adjacent HeNB of existence of the unregistered MUE using a closed subscriber group identifier (CSG ID) of the SI of the adjacent HeNB, transmitted from the unregistered MUE,
wherein informing the adjacent HeNB of the existence of the unregistered MUE comprises:
transmitting, to a mobility management entity (MME), a HO request message containing cell global identity (CGI), CSG ID, IC indication, and csg MemberStatus;
identifying, by the MME, whether or not the IC indication is contained in the HO request message, and transmitting an IC request message containing the IC indication to the adjacent HeNB when it is identified that the IC indication is contained in the HO request message; and
comparing, by the adjacent HeNB, the CSG ID in the IC request message with its own CSG ID, and deciding that the unregistered MUE exists when the CSG ID in the IC request message corresponds to its own CSG ID.

2. The method of claim 1, wherein the deciding of the occurrence of the unregistered MUE comprises:
identifying, by the unregistered MUE, the adjacent HeNB; and
comparing, by the unregistered MUE, the CSG ID and dedicated CSG ID of the adjacent HeNB with its own CSG whitelist and transmitting a proximity indication message to the MeNB using a handover (HO).

3. The method of claim 2, wherein the identifying of the adjacent HeNB comprises:
transmitting, by the MeNB, a ReportProximityConfig message to the unregistered MUE;
performing, by the unregistered MUE, an autonomous search and receiving a SystemInformationBlock (SIB) Type1 message from the adjacent HeNB, when identifying the ReportProximityConfig message; and
decoding, by the unregistered MUE, the CSG ID of the adjacent HeNB in the SIB Type1 message and identifying the adjacent HeNB.

4. The method of claim 3, wherein the ReportProximityConfig message is transmitted by being contained in an RRC Connection Reconfiguration (RRCConnectionReconfiguration) message.

5. The method of claim 1, wherein searching for the SI of the adjacent HeNB and transmitting the searched SI to the MeNB comprise:
transmitting, by the MeNB, an RRCConnectionReconfiguration message containing a Measurement Configuration (MeasConfig) message to the unregistered MUE;
transmitting, by the unregistered MUE, a measurement report message containing a physical cell identifier (PCI) of the adjacent HeNB to the MeNB;
commanding, by the MeNB, the unregistered MUE to collect the SI of the adjacent HeNB;
transmitting, by the unregistered MUE, the SI to the MeNB; and
comparing, by the unregistered MUE, the CSG ID and dedicated CSG ID of the adjacent HeNB with its own whitelist, and requesting the MeNB of a HO or transmitting interference coordination (IC) indication to the MeNB depending on the presence of correspondence.

6. The method of claim 5, wherein the SI is transmitted by being contained in the measurement report message.

7. The method of claim 5, wherein the IC indication is transmitted by being contained in the measurement report message.

8. The method of claim 5, wherein transmitting the IC indication to the MeNB further comprises performing a HO to the MeNB, when the CSG ID and dedicated CSG ID of the adjacent HeNB correspond to those in the CSG whitelist of the unregistered MUE.

9. The method of claim 8, wherein, if the CSG ID and dedicated CSG ID of the adjacent HeNB correspond to those in the CSG whitelist of the unregistered MUE, member indication is set as 'member'.

10. The method of claim 5, wherein, in informing the adjacent HeNB of the existence of the unregistered MUE, the unregistered MUE transmits the IC indication to the MeNB when only the dedicated CSG ID of the adjacent HeNB corresponds to that in the CSG whitelist of the unregistered MUE.

11. The method of claim 10, wherein, in informing the adjacent HeNB of the existence of the unregistered MUE, the unregistered MUE sets the member indication as 'non-member' when only the dedicated CSG ID of the adjacent HeNB corresponds to that in the CSG whitelist of the unregistered MUE.

12. The method of claim 1, wherein, in transmitting the IC request message containing the IC indication to the adjacent HeNB, the MME transmits a HO preparation failure message to the MeNB when the IC indication is contained in the IC request message.

* * * * *